(12) United States Patent
Braghiroli

(10) Patent No.: US 6,668,236 B1
(45) Date of Patent: Dec. 23, 2003

(54) PROCESS FOR CALIBRATING A SENSOR FOR MEASURING AN ANGLE OF INCLINATION OF A MOTOR VEHICLE WHEEL

(75) Inventor: Francesco Braghiroli, Reggio Emilia (IT)

(73) Assignee: Snap-on Equipment S.r.l., Correggio (IT)

(*) Notice: Subject to any disclaimer, the term of this patent is extended or adjusted under 35 U.S.C. 154(b) by 0 days.

(21) Appl. No.: 10/156,188

(22) Filed: May 29, 2002

(30) Foreign Application Priority Data

May 29, 2001 (IT) ..................... MO2001A0110

(51) Int. Cl.⁷ .................. G01C 19/00; G01C 25/00
(52) U.S. Cl. ..................................... 702/104
(58) Field of Search .................. 702/85, 104, 116, 702/127, 150, 151, 154; 73/1.75

(56) References Cited

U.S. PATENT DOCUMENTS

| | | | | |
|---|---|---|---|---|
| 5,719,790 A | * | 2/1998 | Lohrenz et al. | 702/104 |
| 6,186,267 B1 | * | 2/2001 | Hackl et al. | 180/444 |
| 6,195,606 B1 | * | 2/2001 | Barta et al. | 701/70 |
| 6,327,785 B1 | * | 12/2001 | Dale, Jr. et al. | 33/288 |
| 6,341,013 B1 | * | 1/2002 | Battiti et al. | 356/139.09 |
| 6,446,018 B1 | * | 9/2002 | Isermann et al. | 702/96 |
| 6,480,778 B2 | * | 11/2002 | Tanak et al. | 701/69 |
| 2002/0166389 A1 | * | 11/2002 | Desbiolles | 73/862.325 |

* cited by examiner

Primary Examiner—John Barlow
Assistant Examiner—Demetrius Pretlow
(74) Attorney, Agent, or Firm—Browdy and Neimark, P.L.L.C.

(57) ABSTRACT

A process for calibrating a sensor for measuring an angle of inclination of a motor vehicle wheel, comprising a transducer which converts a unit of measurement of an angular displacement into a different quantity, constituted in the example by an electrical signal, which represents an indication of the measured angle, comprising: reading a plurality of known measurements relating to known and different angular displacements $x_j$; reading and storing a plurality of ordered pairs $(x_j, f_j)$, where $x_j$=known measurement of angular displacement and $f_j$=corresponding measurement of a transduced quantity obtained from a reading; calculation of a plurality of low-degree interpolating polynomials which are lower than the plurality of ordered pairs $(x_j, f_j)$, each of which results from a determined number of the ordered pairs of contiguous ordered pairs $(x_j, f_j)$. A calculation of a measurement of an angular displacement not coinciding with any of known measurements for angular displacements $x_j$ is performed with at least one polynomial interpolation using at least one of the interpolating polynomials, which is selected so that a measurement f read at the sensor for measurement x of the angular displacement (to be measured) is comprised within a field described by measurements $f_j$ belonging to contiguous ordered pairs $(x_j, f_j)$.

5 Claims, 1 Drawing Sheet

PROCESS FOR CALIBRATING A SENSOR FOR MEASURING AN ANGLE OF INCLINATION OF A MOTOR VEHICLE WHEEL

BACKGROUND OF THE INVENTION.

The process is of a type comprising a system (transducer) which converts a value of an angular displacement into a different quantity, in the example an electrical signal representing the indication of the displacement measured. A problem common to all transducers is the linearization of the measurement in output with those measured so that a required degree of accuracy is obtained.

In more general terms, the problem is finding a practical way to determine and enact a correlation between input measurement (the angle to be measured) and output measurement, which represents with the required level of exactness the "true"relation (never strictly linear) between the two within a certain field of definition i.e. the field of use of the sensor.

Usual methods mostly utilise calibration systems based on the reading of a few pairs of measurements (generally two or three) with which a relation between input measurement and output measurement is constructed, in geometrical terms, from a curve described by the pairs. This is the cause of errors of linearization which tend to increase progressively for pairs of measurements having pair values which are increasingly different to those used for the construction of the correlation (curve).

The use of a large number of pair values, however, for constructing the curve would lead to considerable complication in calculation, without guaranteeing an improvement in the approximation.

The main aim of the present invention is to obviate the drawbacks and limits in the prior art.

This aim and more besides are all attained by the present invention as it is characterised in the accompanying claims.

SUMMARY OF THE INVENTION

A process for calibrating a sensor for measuring an angle of inclination of a motor vehicle wheel, comprising a transducer which converts a unit of measurement of an angular displacement into a different quantity, constituted in the example by an electrical signal, which represents an indication of the measured angle, comprising: reading a plurality of known measurements relating to known and different angular displacements $x_j$; reading and storing a plurality of ordered pairs $(x_j, f_j)$, where $x_j$=known measurement of angular displacement and $f_j$=corresponding measurement of a transduced quantity obtained from a reading; calculation of a plurality of low-degree interpolating polynomials which are lower than the plurality of ordered pairs $(x_j, f_j)$, each of which results from a determined number of the ordered pairs of contiguous ordered pairs $(x_j, f_j)$. A calculation of a measurement of an angular displacement not coinciding with any of known measurements for angular displacements $x_j$ is performed with at least one polynomial interpolation using at least one of the interpolating polynomials, which is selected so that a measurement f read at the sensor for measurement x of the angular displacement (to be measured) is comprised within a field described by measurements $f_j$ belonging to contiguous ordered pairs $(x_j, f_j)$.

BRIEF DESCRIPTION OF THE DRAWINGS

Further characteristics and advantages of the present invention will better emerge from the detailed description that follows of a preferred but nonexclusive embodiment of the invention, illustrated purely by way of a nonlimiting example in the accompanying figures of the drawings, in which.

DESCRIPTION OF THE PREFERRED EMBODIMENTS

Figure 1:
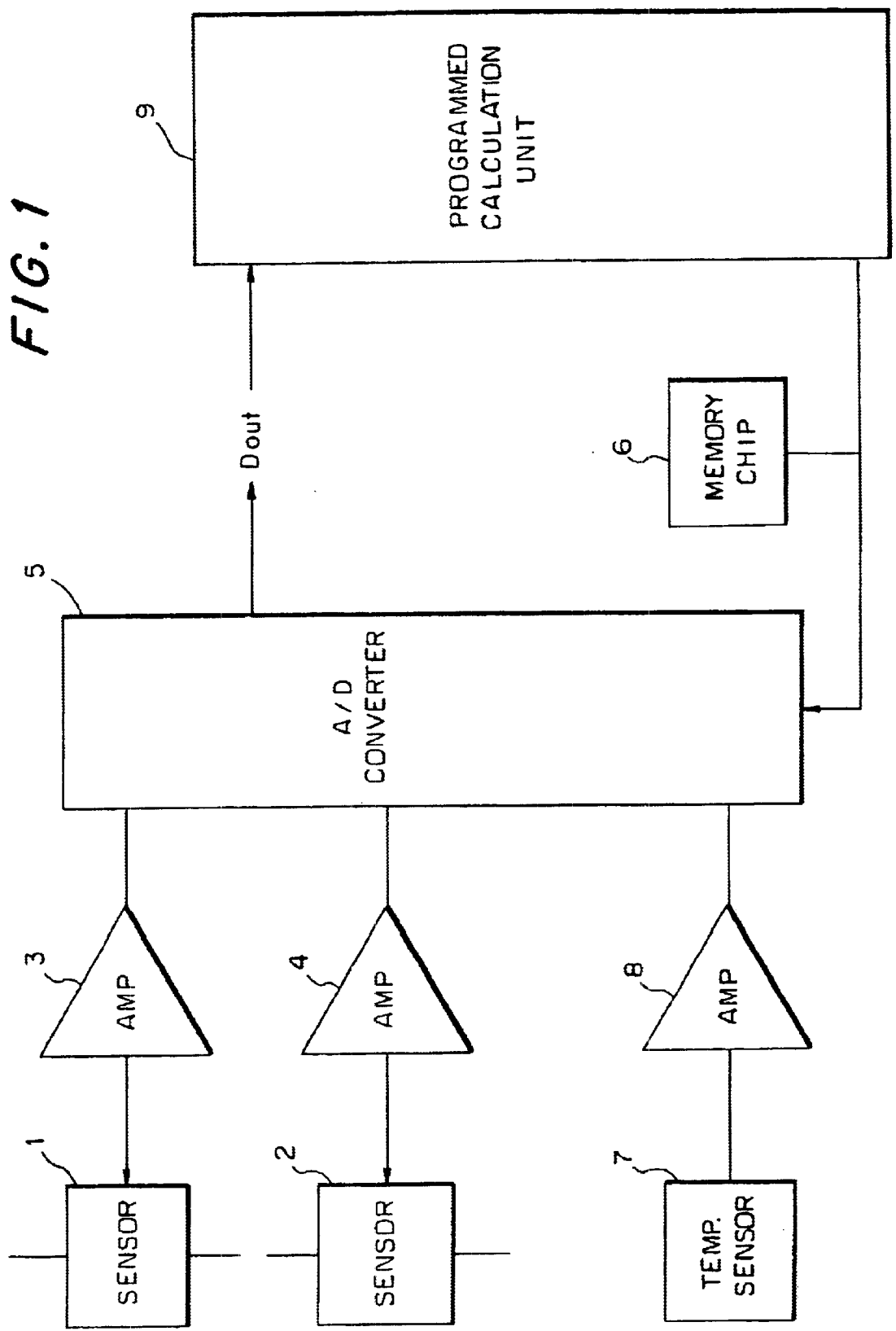
FIG. 1 is a diagram of an apparatus for realising the invention.

The process of the invention for calibrating a sensor for measuring an angle of inclination of a motor vehicle wheel comprises a system (transducer) which converts a unit of measurement of an angular displacement into a different quantity, constituted in the example by an electrical signal, a quantity which represents an indication of the measured angle. The process comprises the following stages:

reading a plurality of measurements relating to known and different angular displacements $x_j$;

reading and storing a plurality of ordered pairs $(x_j, f_j)$, where $x_j$=known measurement of angular displacement and $f_j$=corresponding measurement of the transduced quantity obtained from a reading;

calculation of a plurality of low-degree interpolating polynomials which are lower than the plurality of ordered pairs of read measurements $(x_j, f_j)$, each of which results from a determined number of the ordered pairs of contiguous ordered pairs $(x_j, f_j)$, also known as knots.

Calculation of value x of an angular displacement not coinciding with any of the known measurements for angular displacements $x_j$ is done through at least one polynomial interpolation actuated by at least one of the interpolating polynomials selected in order that the measurement f read at the sensor for measurement x of the angular displacement (to be measured) is comprised within the field identified by values $f_j$ belonging to contiguous pairs of read measurements $(x_j, f_j)$ used for determining the interpolating polynomial.

In particular, the interpolating polynomials do not exceed the degree of four. In this perspective it is especially suitable to use a cubic "spline"polynomial interpolation, which uses third-degree local polynomials and exhibits the considerable advantage of producing an overall interpolation formula which has excellent continuity and derivability characteristics within the local intervals and in the ordered pairs. This characteristic is especially suitable in the linearization of sensors since it corresponds to having the output of the linearization formula free of angular points and jumps, both in the intervals and the ordered pairs.

The process is actuated by means of an apparatus which is physically contained in a single body and comprises:

at least one sensor 1, 2 for converting the value of a measurement of an angular displacement into an electrical signal, which represents the indication of the measured unit x, at least one chip 6 for storing the plurality of the ordered pairs $(x_j, f_j)$, a programmed unit of calculation 9.

Completing the apparatus are gain amplifiers 3 and 4 for amplifying the signals emitted by the sensors 1 and 2 and an analog/digital converter 5 the output of which D out is transferred to the Programmed calculation unit.

A temperature sensor 7 is included in the illustrated embodiment, provided with a signal conditioner 8 which has the specific function of correcting errors caused by working temperatures, a problem which commonly afflicts sensors of inclination.

The temperature sensor 7 enables the readings to be done as it takes into account the influence of working temperatures thereon. It calibrates by taking the output measurements of the sensor at several known points and at several different temperatures. In this way a matrix mxn is built up, which links sensor output measurement and angular position at the temperature at which the reading was taken.

The process as above-described is then carried out, using "local" interpolating polynomials. In general a sub-matrix pxq of the main matrix is identified, and then single-dimension interpolations of order q-1 are made in the direction (for example) of the lines; finally a single-dimension interpolation of order p-1 is made, in the direction of the columns.

In particular, cubic spline interpolation can be performed.

What is claimed is:

1. A process for calibrating a sensor for measuring an angle of inclination of a motor vehicle wheel, comprising a transducer which converts a unit of measurement of an angular displacement into a different quantity, constituted in the example by an electrical signal, which represents an indication of the measured angle, comprising:

reading a plurality of known measurements relating to known and different angular displacements $x_j$;

reading and storing a plurality of ordered pairs $(x_j, f_j)$, where $x_j$=known measurement of angular displacement and $f_j$=corresponding measurement of a transduced quantity obtained from a reading;

a calculating of a plurality of low-degree interpolating polynomials which are lower than the plurality of ordered pairs $(x_j, f_j)$, each of which results from a determined number of the ordered pairs of contiguous ordered pairs $(x_j, f_j)$; wherein a calculation of a measurement of an angular displacement not coinciding with any of known measurements for angular displacements $x_j$ is performed with at least one polynomial interpolation using at least one of the interpolating polynomials, which is selected so that a measurement f read at the sensor for measurement x of the angular displacement (to be measured) is comprised within a field described by measurements $f_j$ belonging to contiguous ordered pairs $(x_j, f_j)$ used for determining the at least one interpolating polynomial.

2. The process of claim 1, wherein the interpolating polynomials are not higher than a fourth degree.

3. The process of claim 2, wherein the process uses a cubic spline interpolation.

4. The process of claim 1, wherein a plurality of readings is made, comprising the plurality of known angular displacements $x_j$, different one to another, and a plurality of ordered pairs $(x_j, f_j)$ is also read and stored, where $x_j$=known measurement of angular displacement and $f_j$=corresponding measurement of different quantity obtained; the pluralities of readings of known angular displacements and of ordered pairs being made together with a contemporaneous reading and storing of temperature levels at moments in which the pluralities of readings are made; a matrix mxn being built up to link couples of sensor output measurements and angular positions to a temperature at which a reading thereof was made; data derived therefrom to be used in an interpolation using local interpolating polynomials.

5. An apparatus for actuating the process of claim 1, comprising the sensor which converts a measurement of an angular displacement into an electrical signal representing an indication of measured quantity; a chip for storing a plurality of the ordered pairs $(x_j, f_j)$, a programmed calculation for performing the interpolation.

* * * * *